July 19, 1938.  C. G. DAUBER  2,124,105
THREAD CUTTING MACHINE
Filed Jan. 13, 1937   3 Sheets-Sheet 1

INVENTOR.
Charles G. Dauber,
BY Morsell, Lieber & Morsell
ATTORNEYS.

July 19, 1938.  C. G. DAUBER  2,124,105

THREAD CUTTING MACHINE

Filed Jan. 13, 1937  3 Sheets-Sheet 2

INVENTOR.
Charles G. Dauber,
BY Morsell, Lieber & Morsell
ATTORNEYS.

July 19, 1938. C. G. DAUBER 2,124,105
THREAD CUTTING MACHINE
Filed Jan. 13, 1937  3 Sheets-Sheet 3
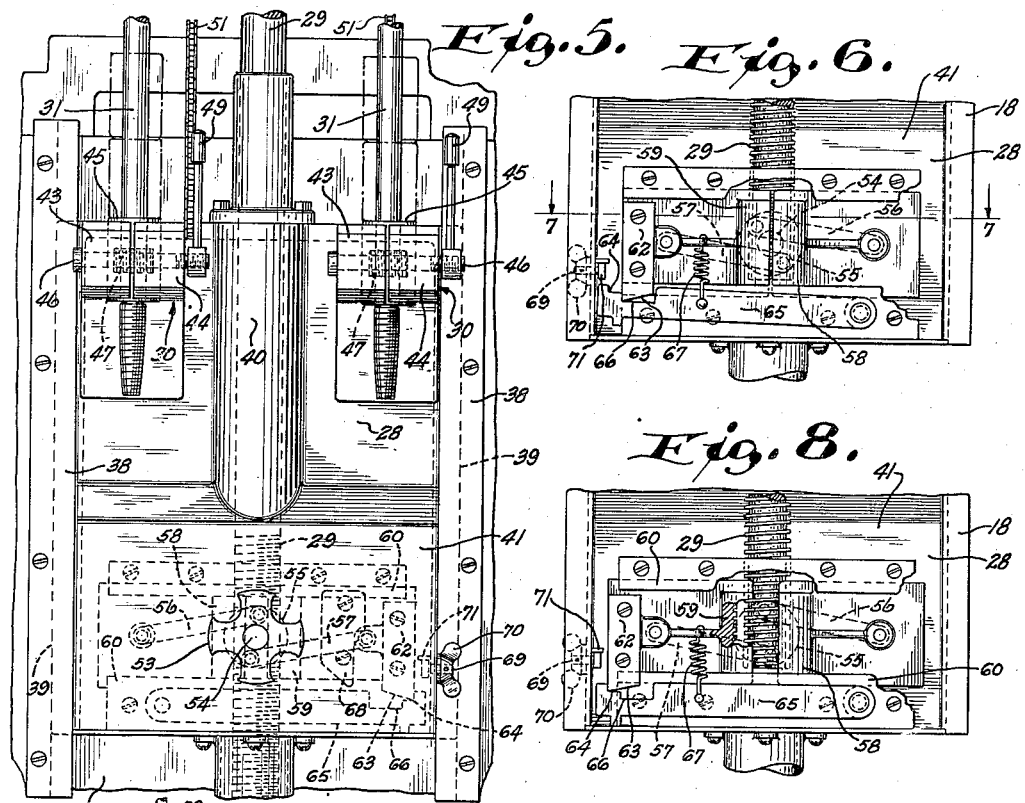
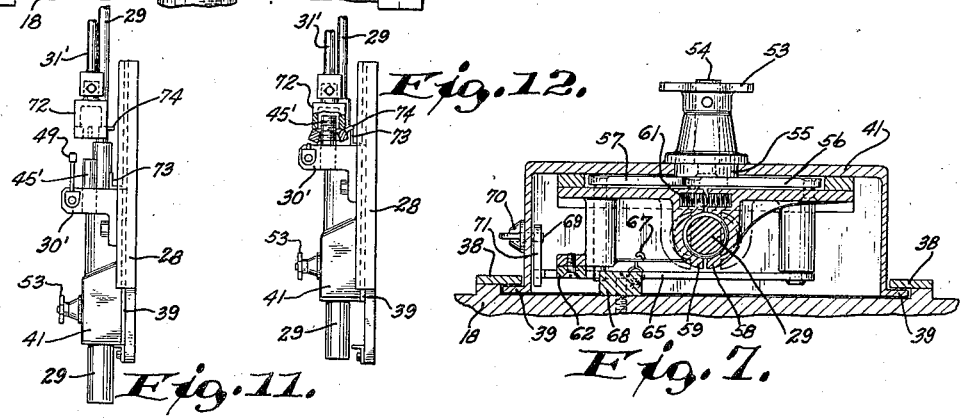
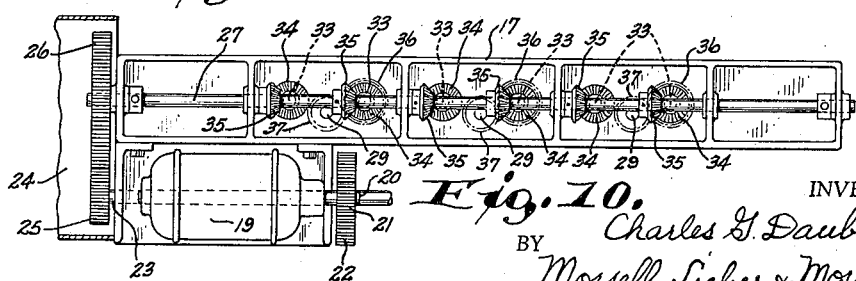
INVENTOR.
Charles G. Dauber,
BY Morsell, Lieber & Morsell
ATTORNEYS.

Patented July 19, 1938

2,124,105

UNITED STATES PATENT OFFICE 2,124,105

THREAD CUTTING MACHINE

Charles G. Dauber, Oshkosh, Wis.

Application January 13, 1937, Serial No. 120,388

4 Claims. (Cl. 10—130)

This invention relates to improvements in thread cutting machines.

A general object of the invention is to provide an improved form of thread cutting machine in which a plurality of pieces of work may be simultaneously threaded in a manner so as to eliminate imperfections in the threads cut, and to minimize the danger of breakage of the cutting tools.

A more specific object of the invention is to provide a thread cutting machine in which the jig carriage is automatically fed upwardly relative to the cutting tool by a lead screw which feeds the carriage at a constant speed and at a proper pressure so that no threads in the work, particularly the initial threads, will be improperly formed or damaged.

Another object of the invention is to provide a multiple jig carriage thread cutting machine with each carriage arranged to carry a pair of jigs and engaged by the operating lead screw intermediate the jigs so that strain will be equalized.

Heretofore, in thread cutting machines the jig carriages have been manually moved relative to the tools, and upon engagement of a tool with the work, operation of the tool would then tend to advance the work. Due to this action, threads would often be scarfed.

With the above in mind it is, therefore, a further object of the invention to overcome these difficulties by providing a thread cutting machine wherein the work is automatically advanced, strain on the cutting tools is eliminated, and damage to threads in the work and to the tools is minimized.

Another specific object of the invention is to provide a thread cutting machine utilizing cutting tools with relatively long flexible shanks, whereby the tools will aline with the work perfectly.

A further object of the invention is to provide a thread cutting machine which is of simple construction, is strong and durable, is efficient in operation, and is well adapted for the purposes set forth.

With the above and other objects in view, the invention consists of the improved thread cutting machine, and its parts and combinations as set forth in the claims and all equivalents thereof.

In the accompanying drawings in which the same reference characters indicate the same parts in all of the views:

Fig. 5 is a similar view only with the threading of the work completed;

Fig. 6 is a fragmentary rear view showing the carriage clamping jaws operatively engaged with the lead screw;

Fig. 7 is a sectional view taken on line 7—7 of Fig. 6;

Fig. 8 is a fragmentary rear view showing the carriage clamping jaws opened and disengaged relative to the lead screw;

Fig. 10 is a top view of the machine showing the driving arrangement for the cutting tools and the lead screws;

Fig. 11 is a fragmentary side view, on a reduced scale, of a modified arrangement for cutting external threads; and Fig. 12 is a similar view after completion of the thread cutting operation and with the die head open.

Figure 1:
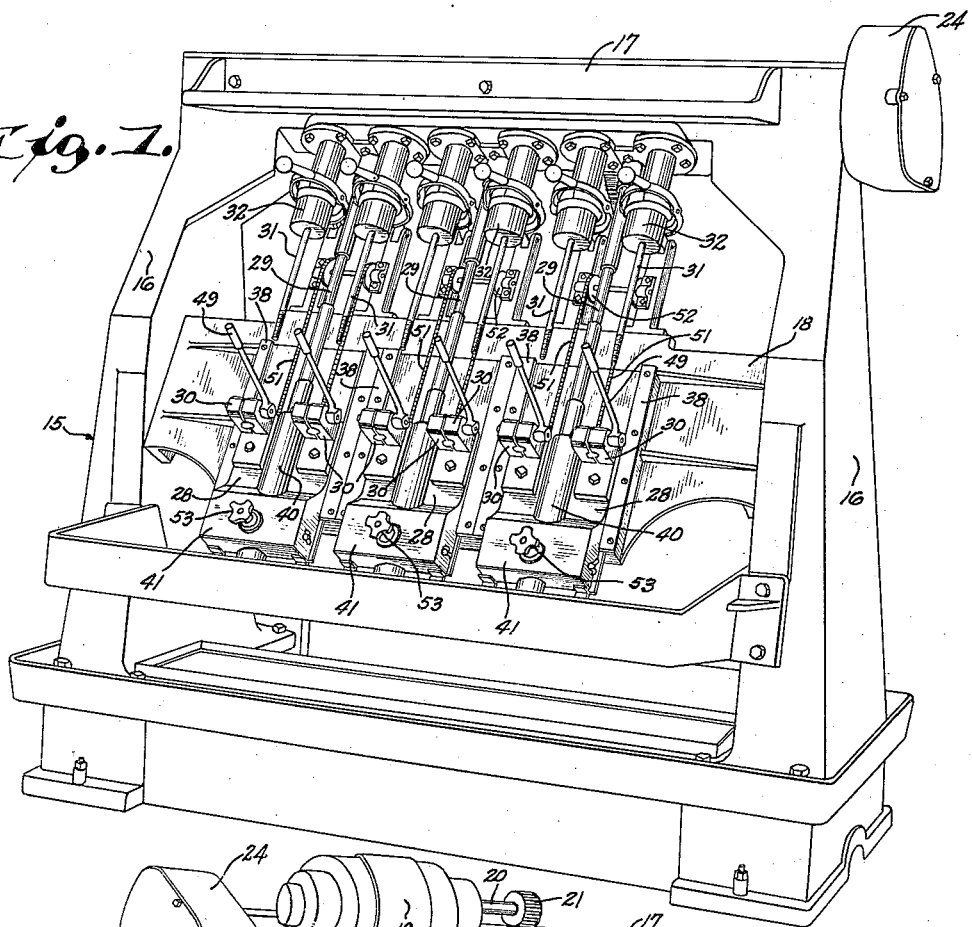
Fig. 1 is a front perspective view of the improved thread cutting machine.

Referring now more particularly to the drawings it will appear that the numeral 15 designates a suitable framework including upright end members or standards 16 spanned by an upper gear and shaft housing and support 17. Between intermediate portions of the standards there is a carriage support 18 having its face portion inclined somewhat from vertical.

The moving parts of the machine are operated by an electric motor 19 which receives electricity from any convenient source (not shown). The projecting end of the motor shaft 20 carries a small gear 21 which meshes with a large gear 22 mounted fast on an intermediate portion of a suitably mounted shaft 23. One end portion of the shaft 23 extends into a gear box 24 (see Figs. 1 and 2) and carries a small gear 25 which meshes with a large gear 26 also in the gear box, and mounted on an end of a main shaft 27 which extends longitudinally through the housing and support 17.

In the exemplification illustrated, there are three dual jig carriages 28 adapted to be raised by three lead screws 29 and the work in the six jigs 30 is adapted to be threaded by engagement with six threading tools 31, each of which is removably depended from a chuck 32. The several tool carrying chucks 32 are operated by shafts 33 which receive rotation from the main shaft 27 through pairs of meshing miter gears 34 and 35. Also the gears 34 are formed with additional gear portions 36 to engage gears 37 on the lead screws 29 for the purpose of turning the latter.

Inasmuch as all of the carriages 28 are identical in construction and operation, and in their engagement with their respective lead screws, only one of the same will be described in detail. For the slidable mounting of each carriage, the support 18 is provided with a pair of spaced tracks 38 under which the flange side edges 39 of a carriage engage. The upper portion of the carriage is formed with a medially positioned housing 40 through which the lead screw 29 freely extends. The lower portion of said housing opens into a box 41 integral with and projecting forwardly of the lower end portion of the carriage. On the front face of the upper portion of the carriage, equally spaced on opposite sides of the housing 40, are a pair of jigs or work holding members 30. Each jig 30 is formed of complementary half-sections 43 and 44 enclosing a block formed with an inner opening to fit and hold the work 45 which is to be tapped. The sections 43 and 44 are held together by loose bolts including a forward bolt 46 which is intermediately surrounded by a coiled spring 47 lodged in complementary recesses 48 in the sections 43 and 44. One end of said bolt carries an operating handle 49 by which the jig may be loosened or tightened to release or hold the work.

Within the box 41, through which the threaded lower portion of the lead screw 29 extends, there are provided means for releasably engaging the carriage 28 with said lead screw so as to be elevated thereby. It should also be observed that movement of each carriage is aided, and retention of the same in adjusted position is insured, by means of a counter-balancing weight 50 depended adjacent the rear side of the machine by chains 51. Said chains extend over cog wheels 52 and the forward ends of the same are secured to upper portions of the carriage 28.

Figure 2:
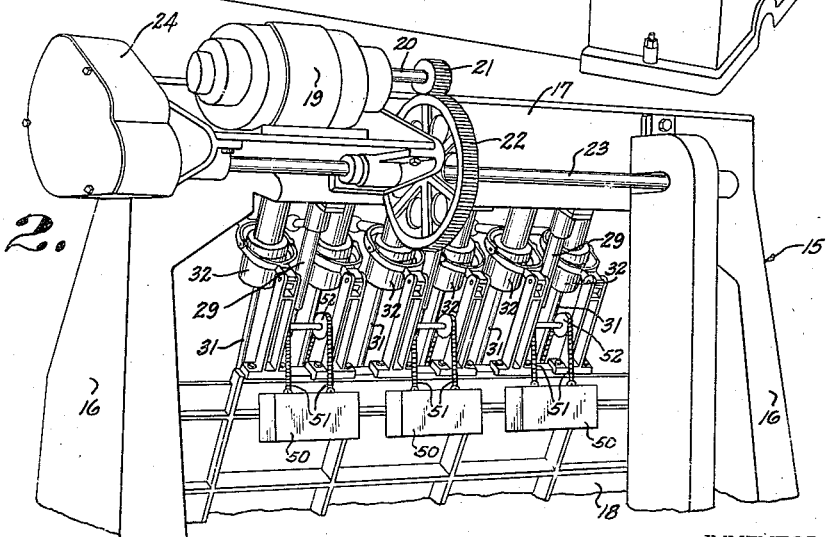
Fig. 2 is a rear perspective view of the upper portion of the machine.
Figures 3, 4, 9:
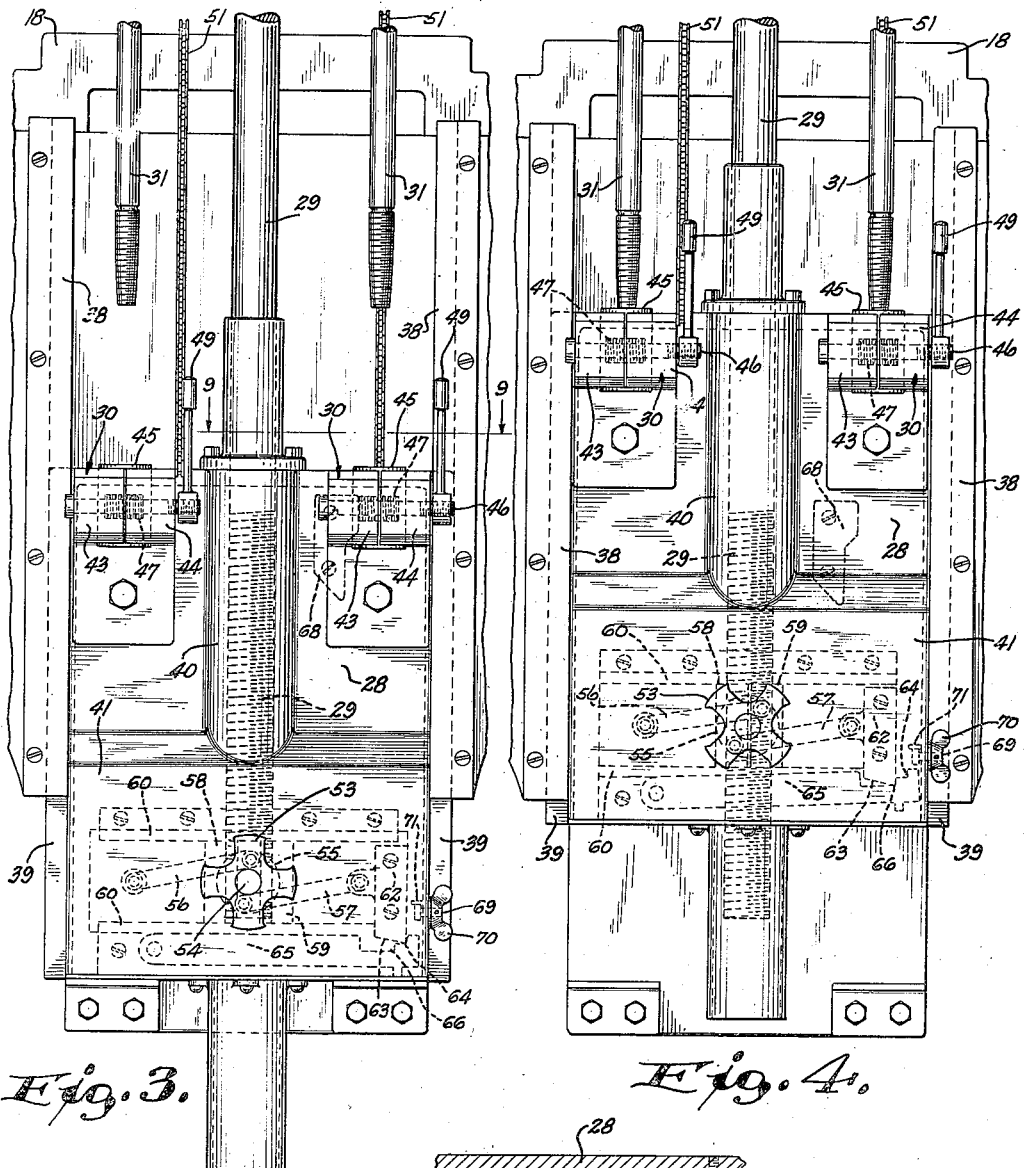
Fig. 3 is a fragmentary front view of a jig carriage and associated mechanism prior to the elevation of the carriage to engage the work with the tools.
Fig. 4 is a similar view only showing the carriage raised with the tools engaging the work to commence the threading thereof.
Fig. 9 is a detail sectional view taken on line 9—9 of Fig. 3.

Before commencing threading operations the parts are in the position shown in Figs. 1, 3, 8; the carriage being lowered and the clamps between the carriage and lead screw being released. While the parts are in this position, the work 45 is slipped into the respective sections 43 and 44 of the jigs of a carriage, and then the handles 49 are manipulated to firmly clamp the work within the jigs. When the electric motor 19 is set into operation, all of the parts driven thereby will move and this includes rotation of the tools 31 as well as the lead screws 29. Thereafter it is desirable to manually move the jig carriage upwardly until the upper end of the work just touches the tools 31, as in Fig. 4. This is best accomplished by grasping the forwardly projecting handle or knob 53 and sliding the carriage upwardly along the tracks 38. At this point it then becomes necessary to positively engage the carriage with its lead screw so that it will be automatically and positively elevated thereby at a constant speed and pressure.

As mentioned heretofore, the screw clamping means are located within the box 41 and the same are engaged or closed by turning the knob 53 in a clock-wise direction in Figs. 1 and 3. The knob 53 is pinned to an inwardly projecting shaft 54 which has fast on its inner end a disc 55. Pivotally connected to spaced peripheral portions of the disc are the ends of a pair of arms 56 and 57, the opposite ends of said arms being pivotally attached to the projecting plate portions of complementary clamping jaws 58 and 59 respectively. The inner clamping faces of said jaws are formed with screw threads, as best shown in Fig. 8, so that when said jaws are brought together, they clampingly embrace the lead screw with their threads operatively engaged by the external threads of the lead screw. The plate portions of the clamping jaws have their edges engaged under tracks 60 under which the same slide. Movement of the clamping jaws toward one another serves to compress a confined coiled spring 61, which subsequently aids separation or opening movements of the jaws.

Due to the mechanism thus far described, when the knob 53 is turned, as previously indicated, from the position of Fig. 3 to the position of Fig. 4, the disc 55 will be turned in the same direction, drawing inwardly on the arms 56 and 57. The arms in turn slide the clamping jaws 58 and 59 toward one another and cause the same to operatively embrace the adjacent portion of the lead screw 29. It should be observed that the plate portion of the jaw 59 carries a lateral protuberance 62 having an inclined operating edge 63. This edge is originally engaged in an upper and outer notch 64 at the end of a pivotal lever 65. However, upon an inward movement of the jaw 59 the edge 63 of the protuberance 62 moves along the lever and drops into an adjacent depressed notch 66 therein and allows a spring 67 to slightly raise said end portion of the lever 65, all as shown in Figs. 4, 6 and 7. Obviously, the engagement of the protuberance 62 in the lower notch 66 of the pivotal lever 65 serves to maintain the clamping jaws in drawn-together screw engaging position.

With the parts arranged and engaged as above described, the jig-carriage is slowly and evenly elevated by the lead screw and the tools 31 cut the desired threads in the work 45. The upward movement of the work relative to the tools continues until the cutting portions of the tools are projected through the work and jigs, as in Fig. 5. At this time, the carriage has been elevated sufficiently to cause the lever 65 to be engaged by a dog 68 which is mounted on a face portion of the carriage support 18. The engagement of the dog with the lever serves to trip or depress said lever, whereupon the edge of the protuberance 62 slips out of the notch 66. The spring 61 then becomes effective to spread the jaws 58 and 59 and the protuberance 62 will again engage the notch 64, as in Figs. 5 and 8. Hence when the thread cutting operations are completed, the jaws are automatically opened and the jig-carriage is released from its lead screw. At this stage, the counterbalancing weights hold the carriage up and the operator then opens the chucks and releases the work. The carriage is then manually lowered to its starting position but the work remains temporarily on the shanks of the tools. Thereafter, the operations are repeated in the same manner, and all of the jig carriages with which the multiple machine is equipped, function in the same manner.

Sometimes during the operation of the thread cutting machine it may become desirable, because of some contingency which may arise, to release a jig carriage from its lead screw so as to prevent further upward movement of the carriage and consequent continued thread cutting. For this purpose there is provided at the side of each jig carriage box 41, an inwardly projecting stub 69 which carries fast thereon an outwardly projecting manipulating handle 70. The inner end portion of the stub 69 carries an eccentrically shaped and flanged plate 71. Normally, the handle 70 is turned so that the elongated and flanged portion of the plate 71 is removed from the free end of the lever 65, as shown in Figs. 3, 4, 5, 6 and 8. When the jig carriage is being positively elevated by the lead screw 29, the free end of the lever 65 is elevated as in Fig. 6. When it becomes desirable to open the jaws 58 and 59 so as to release the jig carriage from the lead screw, the handle or knob 70 is turned so as to bring the elongated and flanged end of the plate 71 into contact with the free end of the lever 65, as shown in Fig. 7. This movement will therefore depress said end portion of the lever and release the protuberance 62 from the notch 66, whereupon the clamping jaws 58 and 59 are free to separate, disconnecting the jig carriage from the elevating lead screw.

A slight modification of the invention is illustrated in Figs. 11 and 12. These views illustrate an adaptation of the invention for cutting external threads on bolts or the like 45'. The work 45' is clamped in the jig 30' which is carried by the carriage 28. Above the jig, and carried by the lower end portion of the revolving tool shank 31', is a standard self-opening die head 72, which die head encloses the cutting member.

The jig carriage 28 is manually moved up to immediately below the die head in the manner described in connection with the principal form of the invention. Said jig carriage includes clamping jaws similar to those described in connection with the principal form of the invention, and upon proper location of the jig carriage relative to the die head, the clamping jaws are engaged with the lead screw 29 so that the carriage 28 will then be automatically elevated relative to the revolving die head 32. The work 45' moves into the die head through the cutting tool until thread cutting operations are completed as in Fig. 12. At this stage, an angular lug 73 fast on an upper face portion of the jig carriage, strikes and manipulates a dog 74 projecting laterally of the die head 72, and this movement of the dog serves to open the die head so as to release the tool from the work. At this point, the mechanism in the jig carriage box 41 also becomes effective to disengage the clamping jaws therein from the lead screw 29.

In the improved thread cutting machine, it will be apparent from the drawings that the shanks 31 which carry the thread cutting tools are relatively elongated, and the same are flexible. Due to this arrangement, the tools may flex sufficiently to aline perfectly with the work. The machine, being of a multiple character, permits expeditious and efficient operations, and each jig carriage carries two sets of work equally spaced on opposite sides of the lead screw so that the strains and stresses are equalized. During thread cutting operations, the jig carriages are positively driven by their respective lead screws so that the work is engaged with the tools at a constant speed and pressure with the result that all of the threads are perfectly formed and the percentage of tool breakage is materially lessened.

From the foregoing description it will be seen that the improved thread cutting machine is of simple and novel construction, is easily loaded and unloaded, and proper thread cutting is effected thereby.

What is claimed as the invention is:—

1. A thread cutting machine, comprising a supporting frame, a pair of spaced-apart cutting tools depending therefrom, a work carriage slidably mounted on the frame below said tools, a pair of spaced-apart work-holding members on said carriage and alined with the lower ends of said tools, an elevating screw extending along the carriage intermediate said work-holding members and adapted to move the carriage toward and longitudinally of the tools, and means for engaging the carriage with and automatically disengaging it from the screw.

2. In a machine of the class described, a frame, a power shaft rotatably mounted in said frame, a plurality of rotatable spindles driven by said shaft, each of said spindles being provided with means for holding a threading tool, tools carried by said holding means, a plurality of carriages slidably mounted on the frame for axial movement relative to said tools, a pair of work holding devices on each carriage, a plurality of elevating screws driven by said shaft, there being a screw for each carriage, means for releasably securing each carriage to its screw to cause the carriage to move axially on the screw, and coacting means on each carriage and on the frame to release said carriage securing means upon a predetermined range of movement of said carriage.

3. In a machine of the class described, a frame, a power shaft rotatably mounted in said frame, a plurality of rotatable spindles driven by said shaft, each of said spindles being provided with means for holding a threading tool, tools carried by said holding means, a plurality of carriages slidably mounted on the frame, each carriage being adapted for axial movement relative to a pair of said tools, a pair of work holding devices on each carriage and alined with a pair of tools, a plurality of elevating screws driven by said shaft, there being a screw for each carriage, independent means for releasably securing each carriage to its screw to cause the carriage to move axially on the screw, and coacting means on each carriage and on the frame to release said carriage securing means upon a predetermined range of movement of said carriage.

4. A thread cutting machine, comprising a frame, a pair of spaced-apart cutting tools mounted thereon, a work carriage slidably mounted on the frame longitudinally of the tools, a pair of spaced-apart work-holding members on said carriage and alined with the cutting ends of said tools, a carriage moving screw extending along said carriage intermediate said work-holding members and adapted to move the carriage toward and longitudinally of the tools, and means for engaging the carriage with and automatically disengaging it from the screw.

CHARLES G. DAUBER.